Sept. 21, 1954　　　　H. R. FLETCHER　　　　2,689,615
DRIVE SYSTEM FOR CONVERTIBLE TYPE AIRCRAFT
HAVING JET-DRIVEN LIFTING ROTOR
Filed Dec. 3, 1952　　　　　　　　　　　　4 Sheets-Sheet 1

Horace R. Fletcher INVENTOR

BY W Britton Moore

ATTORNEY

Sept. 21, 1954  H. R. FLETCHER  2,689,615
DRIVE SYSTEM FOR CONVERTIBLE TYPE AIRCRAFT
HAVING JET-DRIVEN LIFTING ROTOR
Filed Dec. 3, 1952  4 Sheets-Sheet 4
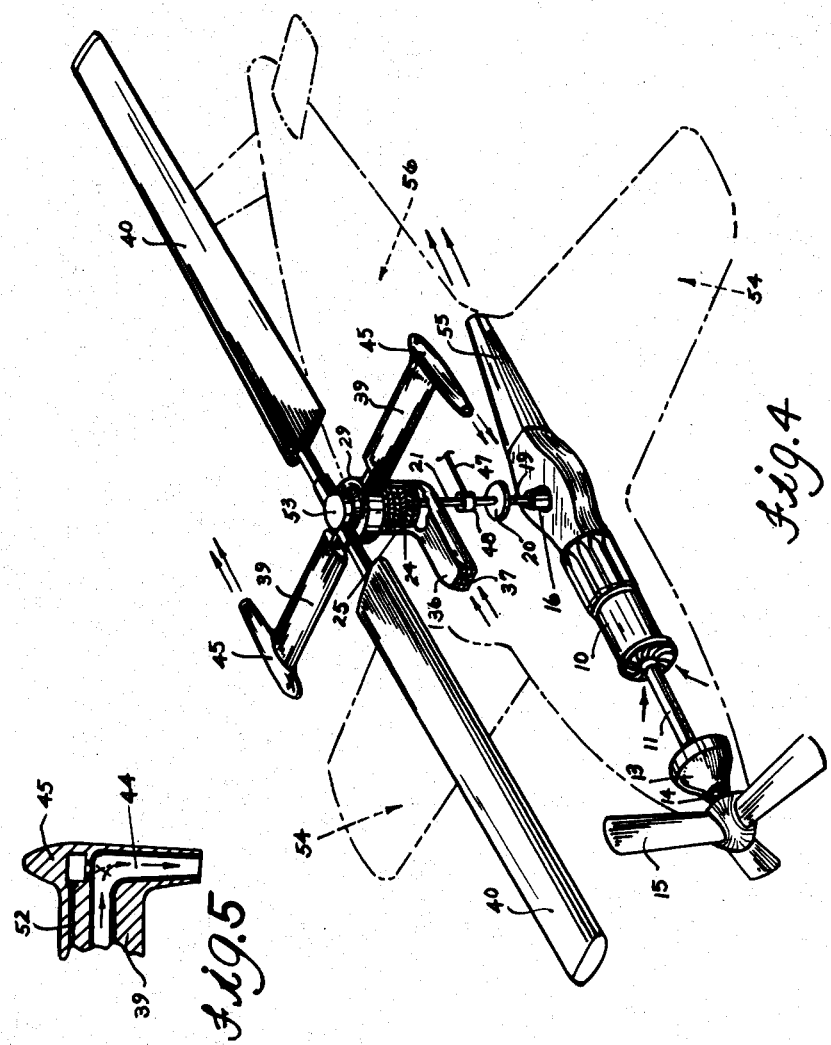
INVENTOR
Horace R. Fletcher
BY
W Britton Moore
ATTORNEY Patented Sept. 21, 1954

2,689,615

UNITED STATES PATENT OFFICE 2,689,615

DRIVE SYSTEM FOR CONVERTIBLE TYPE AIRCRAFT HAVING JET-DRIVEN LIFTING ROTOR

Horace R. Fletcher, Franklin, N. J., assignor, by direct and mesne assignments, to Charles J. Fletcher, Franklin, N. J., and Max W. Berg, Clifton Heights, Pa.

Application December 3, 1952, Serial No. 323,910

1 Claim. (Cl. 170—135.22)

This invention relates to improvements in propulsion and driving mechanisms for helicopter-type aircraft, such as helicopters, or convertible aircraft and the like.

Heretofore, various devices have been provided for driving helicopter rotor blades which includes the type utilizing auxiliary anti-torque devices or counter rotating rotor systems and the like. It has also been the practice to employ jet engines or pressure jet systems at the tips of the rotor blades.

Various devices have also been heretofore provided for the propulsion of helicopter-type aircraft, such as convertiplanes and compound helicopters and the like, wherein the main power source performs the function of driving both the helicopter rotor blade and propellers. These latter devices provide propulsion at high forward speeds and for anti-torque requirements by utilizing turbojet, turboprop, reciprocating power types, or some combination thereof. Consequently, in these prior art devices, the lifting and propelling forces required for flight of the aircraft are accomplished through conveyance of the power through the use of drive shafts, transmissions, clutch arrangements, and the like. However, these prior art devices are of a relatively complicated nature and have proven unsatisfactory.

The principal object of the present invention is to provide a rotor head of new and novel arrangement embodying interconnecting moving and stationary parts, wherein the power, generated by an engine, such as a turboprop engine, in the form of shaft torque, is utilized to drive a small compressor installed in the stationary portion of the rotor head. Consequently, the air compressed by the compressor is passed from the stationary portion of the rotor head into the rotatable rotor hub portion thereof and out through torque arms attached thereto and into pod-jet engines attached at the tips of the torque arms, wherein fuel is provided for mixing with the compressed air thereby forming a combustion mixture wherefrom thrust is generated to drive the rotor head and the helicopter rotor blades attached thereto.

Another object is to provide an improved and simplified means for aircraft propulsion wherein the main power source, such as a turboprop engine, may, at the discretion of the pilot, drive either a small compressor installed in the rotor head, or drive a propeller, arranged for example, in the nose of the fuselage, or both, but wherein the power required to perform these functions simultaneously is of such a reduced degree that these operations are accomplished in an efficient manner.

Another object is to provide an improved rotor head which, in addition to propelling the usual type helicopter rotor blades, provides means for directly driving a small, axial float type compressor, housed within the stationary portion of the rotor head driven by a main power source, such as a turboprop engine.

Another object is to provide for conveyance of fresh air to the compressor through a scoop and duct housed within the stationary portion of the rotor head.

Still another object is to provide for the conveyance of air in the compressed state from the exit ducting of the compressor into the rotatable portion of the rotor head and into small pod-type jet engines, mounted at the tips of torque arms attached to the rotor hub.

Still another object is the provision of means for transporting fuel to the pod-jet engines.

A further object is to provide means for assuring free wheeling of the rotor hub from the rotor head by eliminating any direct drive linkages between the main power source of the turbo jet engine and the driving force provided by the pod-jet engines.

A further object is the provision of a simplified propulsion device utilizing a compressor for supplying compressed air to pod-jet engines driving the rotor hub, and for driving the rotor hub independently of the main power source to eliminate any reactive torques from the rotor system to provide for free wheeling between the stationary rotor head and the rotatable rotor hub.

A further object is to provide means for driving the compressor by direct linkages from the main power source and for driving a propellor by direct linkages from the main power source.

Still a further object is to provide for free wheeling of the rotor hub of the rotor head for controlling the rotor blades at high speeds, which is a necessary requirement in the development of the high speed helicopter, compound helicopter, or convertible aircraft.

Another object is to provide for simplicity of the total lifting and propulsive system wherein a compressor of nominal dimensions forms the main stationary portion of the rotor head and forms a deck for and is installed directly beneath the rotatable rotor hub. Thus, an improved ducting of air is assured and piping losses of the compressed air to the pot-jet engines is minimized. Furthermore, the shaft torque communicated by the turbojet engine for driving the compressor, does not extend beyond the stationary portion of the rotor head so that reactive torque is not imparted to the aircraft fuselage. Also, the only connecting links between the rotatable rotor hub and stationary portion of the rotor head, except for bearing surfaces, controls, etc., are the passage of compressed air and fuel to the pod-jet engines whereby the shaft torque of a turboprop engine is communicated selectively to drive the compressor and propeller through the adoption of relatively simple and known type clutch arrangements, each installed between the engine and the respective driving unit.

Another object is to provide an improved helicopter rotor and propulsive system embodying a new and uniquely conceived rotor head wherein all the driving forces available from a main power source are utilized in a most sufficient manner for driving a compressor installed in the stationary portion of the rotor head and a propeller installed in the fuselage of the aircraft. Thus, a compressor is utilized in supplying compressed air to pod-jet engines attached to torque arms to provide driving power to the rotatable portion of the rotor head. Therefore, provisions are made for free wheeling of the rotor hub and the elimination of reactive torques of the rotor blades on the fuselage by eliminating any direct drive linkages between the main power source and the driving force provided by the pod-jet engines so that the fuel is delivered from the stationary portion of the rotor head to the pod-jet engines of the rotor hub.

These and other objects of the invention will be apparent by referring to the following specification and accompanying drawings, wherein, Figure 1 is a perspective view of a helicopter housing my propulsion system;

Figure 4 is a perspective view of the assembled propulsion system as shown in Figure 3; and Figure 5 shows a sectional view on the line 5—5 of Figure 2.

Figure 1:
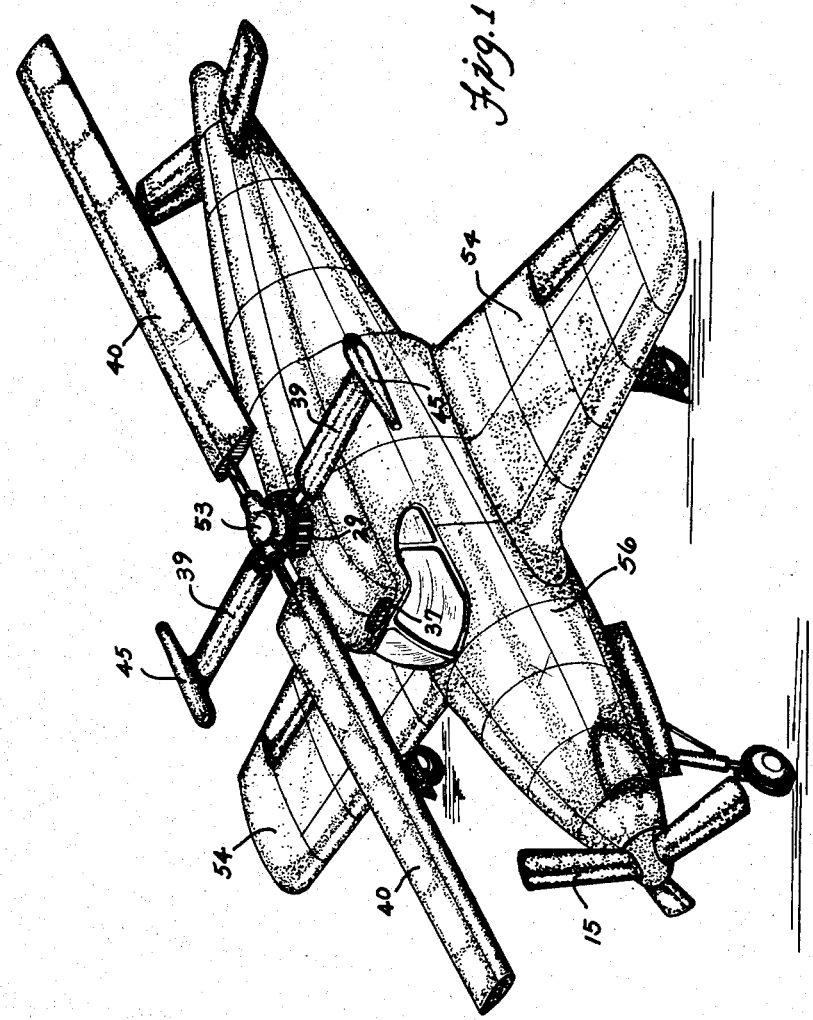

Referring more particularly to the drawings, wherein similar reference characters designate like parts throughout the several views, a conventional turboprop engine 10 is provided with the usual drive shafts 11 and 12 extending forward and aft respectively, therefrom. The fore drive shaft 11 extends to the conventional propeller gear and clutch assembly 15. The aft drive shaft 12 extends within a conventional aft gear housing 16 to a beveled gear 17 which meshes with a beveled gear 18, attached to a small compressor lower drive shaft 19 thereby forming a positive coupling between the drive shafts 12 and 19 and a conventional drive shaft clutch assembly 20, suitably arranged between upper compressor drive shaft 21, and lower compressor drive shaft 19. The upper compressor drive shaft 21 extends from the compressor drive shaft clutch assembly 20 to a combination shaft bearing housing and fuel T 22, and the upper end of compressor drive 21 is securely held by bearing assembly 23. The combination shaft bearing housing and fuel T 22 is axially aligned within the rotating portion 29 of the rotor assembly and is suitably attached thereto, for receiving the upper end of the compressor upper drive shaft 21.

Figure 2:
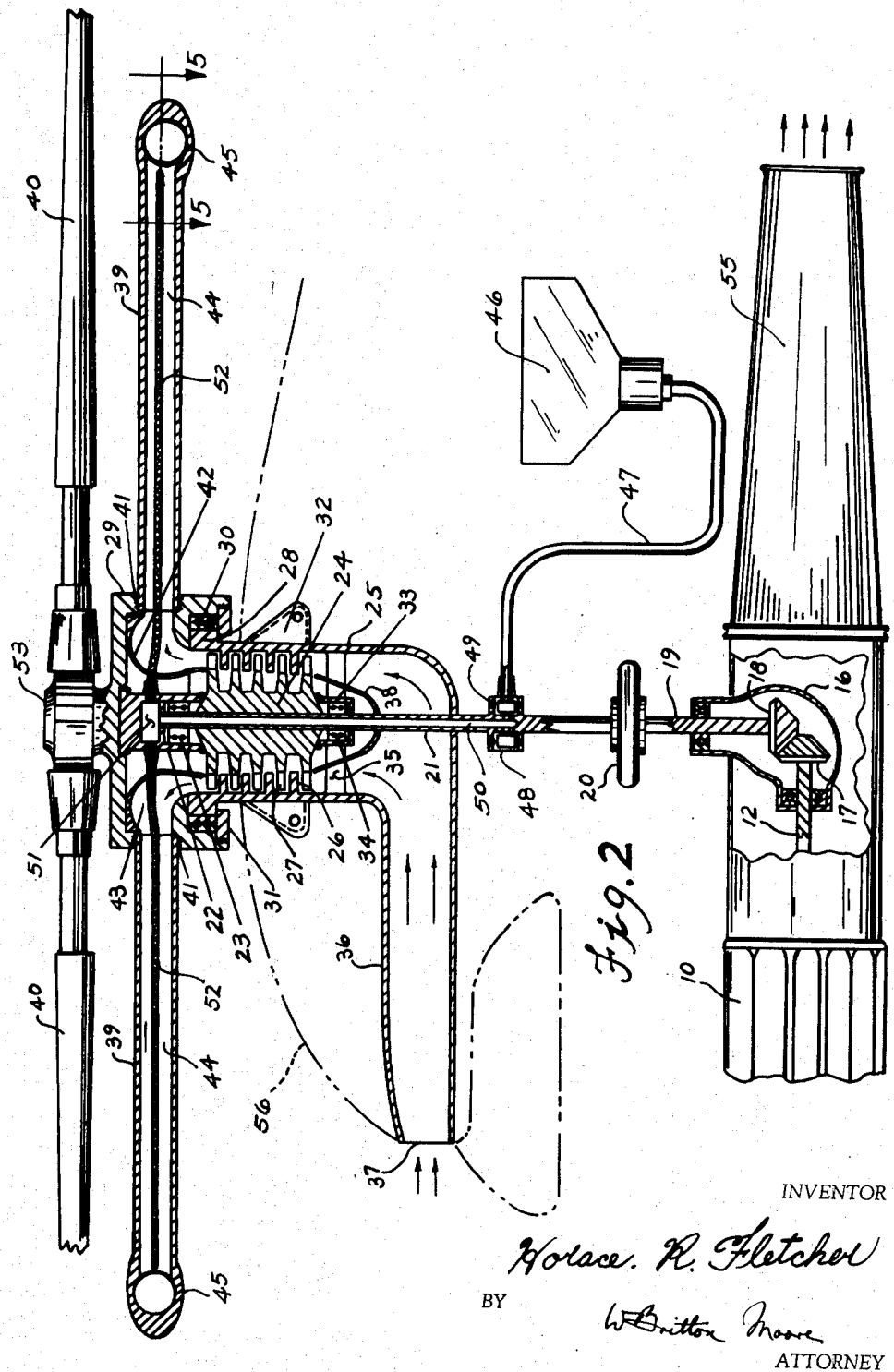
Figure 2 is a side elevation of the improved propulsion system, shown partly in section.

The compressor installation and assembly is best illustrated in Figure 2. The compressor 24 which is of the high pressure type and suitable to compress atmospheric air to a range of approximately six to eight atmospheres, is securely mounted to the upper portion of compressor upper drive shaft 21. Compressor 24 is housed within a cylindrical shaped shell 25 which comprises the conventional stator blades 26 positioned alternately in radial alignment between the conventional rotating blades 27 of compressor 24. Bearing housing and bearing assembly 33 and 34, respectively, provide support for the lower portion of the compressor 24. Radially positioned struts 35 extending to the inner wall of the lower portion of cylindrical shell 25 provide supporting structure for the bearing housing 33. The upper portion of cylindrical shell 25 comprises a flange type structure 28, which serves as the stationary portion of the rotor and provides bearing surface for mounting the rotating portion 29 of the rotor assembly. Rotor bearing 30 is spaced between the bearing surfaces of flange structure and rotating portion 28 and 29, respectively, and securely locks the rotating portion 29 and rotor bearings 30 to the upper portion of cylindrical shell 25 by means of an annular threaded locking nut 31. Thus, the rotating portion of the rotor assembly is permitted free rotation about the flange structure 28 of cylindrical shell 25 with a minimum of friction provided by rotor bearing 30. Mounting structure 32 symmetrically positioned outward around the sides of cylindrical shell 25 provides suitable mounting means for fixedly attaching the latter to the fuselage 56 structure.

The lower structure of the cylindrical shell 25 comprises an elbow shaped compressed air duct housing 36, which extends forward of the compressor upper drive shaft 21 and substantially parallel to the longitudinal axis of the fuselage. Air from atmosphere is drawn in through the air duct opening 37 and is transported via the compressor air duct housing 36 to the outlet end of compressor 24 by the rotating action of the compressor blades 27. Conical shell 38 axially positioned at the entrance end of the compressor 24 and supported by the radial struts 35 provide for a smoother flow of air into the inlet side of compressor 24.

The rotating portion 29, of the rotor assembly comprises a plurality of torque arms 39 and rotor blades 40 symmetrically positioned about the hub portion and extend outward in a radial manner from the rotational axis. Each of the torque arms 39 is attached at the hub portion of the rotating portion 29 by means of a threaded section 41. The interior of the rotating portion 29 provides for a compressed air ducting structure 42. The lower end of the air ducting structure 42 is cylindrically shaped and aligned with the outlet side of compressor 24, thus forming an annular distribution chamber 43 within the rotational portion 29. The upper end of the compressed air ducting structure 42 is aligned with the inlet side of passage 44 of each torque arm 39. The outlet side of passage 44 communicates with the upstream end of each pod-jet engine 45 associated with each torque arm 39, as best shown in Figure 5.

The above arrangement permits the compressor 24 to deliver highly compressed air into the annular distribution chamber 43 and assures of the passage of compressed air therethrough. Each air passage 44 associated with the radially extending torque arms 39, receives adequate and even distribution of compressed air from annular distribution chamber 43. Thus, compressed air is delivered, by means of the pressure provided by a compressor 24 and the centrifugal pumping action of the rotating torque arm 39 into the pod-jet engines 45 attached to the tips of torque arms 34.

A blade hub 53, having rotor blades 40 suitably attached thereto, is securely fastened by suitable means, not shown, to the rotating portion 29 for rotation therewith. Fuel in a suitable storage tank 46, arranged within the fuselage, is delivered by a fuel pipe 47 under pressure to a fuel coupling 48 on compressor upper drive shaft 21, and fuel passes from the stationary portion of the fuel coupling 48 into the rotating portion thereof. Fuel coupling seals 49 are suitably arranged within the coupling 48 to prevent leakage of fuel between the stationary and rotating portions thereof. Fuel is thereafter delivered by a fuel passage 50 extending through the compressor upper drive shaft 21 and upwardly into a fuel distribution chamber 51, which in turn forms the upper portion of the combination shaft bearing housing and fuel T 22, wherein suitable metering of the fuel through radially extending fuel lines 52 is provided. Fuel is thus caused to flow out through the torque arms 39 by way of the passage, not shown, within fuel line 52 and into the upstream end of pod-jet engines 45. Thus, the fuel, upon reaching the pod-jet engines 45, is mixed with compressed air, in a manner suitable for combustion, to provide the necessary thrust required in driving the rotatable portion 29 on the bearing 30 positioned within the rotor assembly. The complete assembly, which shows the compressor 24 drivingly connected to the turboprop engine, is best illustrated in Figure 3.

Figure 3:
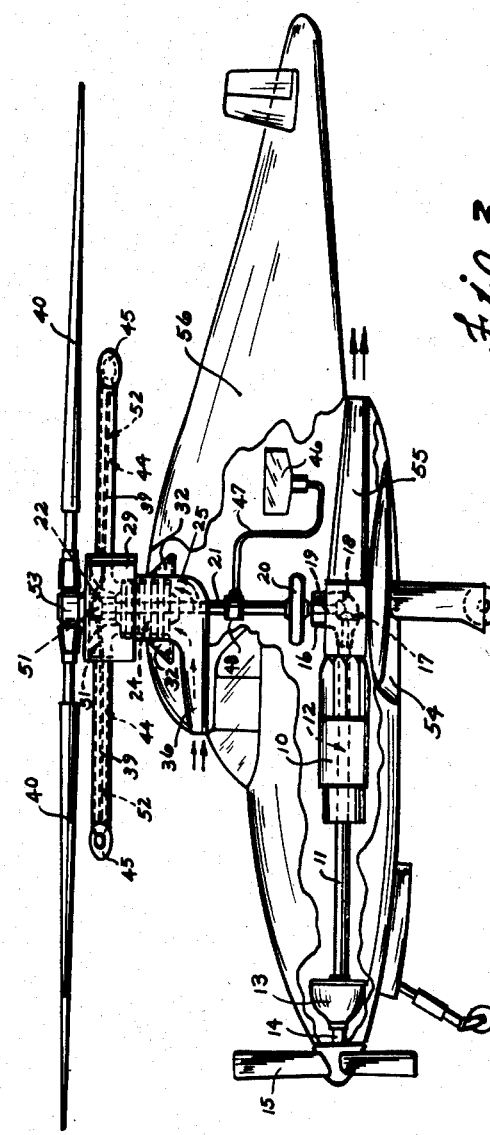
Figure 3 is a side elevation, partly in section, of a helicopter, showing the complete assembly of the propulsion system as proposed.

Referring now to Figures 2 and 3, the turboprop engine 10 provides the total power necessary to accomplish all conditions of flight, that is to say, with the propeller 15 positioned in zero pitch, a relatively small amount of power is absorbed from the turboprop 10, thereby making available to the rotor compressor 24 a very high percentage of the total power available. Assuming then that the propeller 15 is feathered and the turboprop 10 transmits total power to the compressor 24, air is drawn in through air duct housing 36 and delivered through the compressor 24, annular distribution chamber 43 and torque arms 39 by the high speed rotating action of the compressor blades 27, and is discharged through the pod-jets engines 10 in a rearward manner to drive the rotating portion 29. By supplying the pod-jet engine 45 with raw fuel from a fuel supply source 46 within the fuselage 56, the pilot can produce a fuel air ratio suitable for combustion to accomplish any given flight condition.

Because the typical turboprop drive shaft speed is considerably higher than that of the conventional piston type engine, let us say, for example, 13000 R. P. M. for the turboprop in comparison to say 2600 R. P. M. for the piston type engine, it is obvious that the relatively simple aft gear housing 16, with the minimum number of gears, is adequate since the speed ratio between the turboprop drive shaft 12 and the compressor drive shaft 21 are likely to be on the order of 1.1 ratio.

After the pilot has reached a safe hovering altitude, forward flight can begin by increasing the pitch of the propeller 15, thereby producing a forward motion which is accelerated to a speed, let us say for example, 90 to 100 M. P. H., or until substantial lift is produced across the fixed wing 54 to sustain the weight of the aircraft. Once a safe forward speed is achieved, the total power available from the turboprop 10 can slowly be transmitted to the propeller 15 to provide maximum forward speeds. Compressor clutch assembly 20 can be controlled by the pilot to unload the rotor system at a rate dependent upon the aircraft forward velocity. Exhaust gases from the turboprop 10 which are expended through duct 55 to atmosphere, can be further utilized for control means in hovering or add speed to the aircraft during forward flight.

It will be understood that the above illustrations and descriptions of the construction and arrangement of the interconnecting moving and stationary parts form a typical configuration embodying new and salient features hereinafter claimed of the invention but, that modifications may be made of the construction and arrangement of the parts thereto without departing from the spirit of the invention.

I claim:

A helicopter airplane comprising a fuselage, power means in said fuselage, a tractor propeller connected to said power means to be driven thereby, rotor support means fixedly mounted on said fuselage, a lift rotor system mounted on said support means for rotation about a generally vertical axis, said rotor system including lifting blades and hollow torque arms radially disposed with respect to the axis of rotation of the rotor system, jet power units mounted on the outer ends of said arms and arranged to drive the rotor system about its axis of rotation, a shaft coaxial with said axis of rotation, means connecting said shaft and said power means for driving said shaft and including a releasable clutch, said shaft extending upwardly into said support means, an air duct having a forwardly facing intake and extending to said support means, said duct being in communication with the interior of said arms through said support means and including a portion surrounding a part of said shaft adjacent said support means, compressor means mounted on said shaft in said duct portion and arranged to be driven by said shaft for impelling air through said duct and said arms to said jet power units, fuel conduit means extending through said arms to said jet power units, said shaft at its upper part being hollow to provide an axial fuel passage, fuel supply means in said fuselage, means connecting said fuel supply means to said passage, and means connecting said passage to said fuel conduit means, whereby fuel may be delivered from said fuel supply means through said passage and fuel conduit means to said jet power units.

References Cited in the file of this patent

UNITED STATES PATENTS

| Number | Name | Date |
|---|---|---|
| 2,119,806 | Dornier | June 7, 1938 |
| 2,540,190 | Doblhoff | Feb. 6, 1951 |

FOREIGN PATENTS

| Number | Country | Date |
|---|---|---|
| 412,487 | Great Britain | June 28, 1934 |
| 612,189 | Great Britain | Nov. 9, 1948 |
| 996,034 | France | Aug. 29, 1951 |